(12) United States Patent
Odell et al.

(10) Patent No.: US 8,022,930 B2
(45) Date of Patent: Sep. 20, 2011

(54) ERGONOMIC INPUT DEVICE

(75) Inventors: Daniel L. Odell, Redmond, WA (US); Monique Chatterjee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1240 days.

(21) Appl. No.: 11/444,876

(22) Filed: Jun. 1, 2006

(65) Prior Publication Data
US 2007/0279381 A1 Dec. 6, 2007

(51) Int. Cl.
*G06F 3/033* (2006.01)
(52) U.S. Cl. ......... 345/163; 345/156; 345/164; 345/166
(58) Field of Classification Search ............ 345/156, 345/157, 161, 163, 164, 165, 166, 167, 184; 463/36, 37, 38; 74/469, 471 R, 471 XY
See application file for complete search history.

(56) References Cited

U.S. PATENT DOCUMENTS

| | | | | |
|---|---|---|---|---|
| 4,794,384 A | * | 12/1988 | Jackson | 345/166 |
| D373,999 S | * | 9/1996 | Staats | D14/409 |
| 5,576,733 A | * | 11/1996 | Lo | 345/163 |
| 5,648,798 A | | 7/1997 | Hamling | |
| 5,668,574 A | * | 9/1997 | Jarlance-Huang | 345/158 |
| 5,841,425 A | * | 11/1998 | Zenz, Sr. | 345/163 |
| 6,031,518 A | * | 2/2000 | Adams et al. | 345/156 |
| 6,556,150 B1 | * | 4/2003 | McLoone et al. | 345/163 |
| 6,781,573 B1 | * | 8/2004 | Honma et al. | 345/163 |
| 6,795,058 B2 | | 9/2004 | Gordon | |
| 6,828,958 B2 | | 12/2004 | Davenport | |
| 7,006,075 B1 | | 2/2006 | Olson | |
| 7,385,587 B1 | * | 6/2008 | Adapathya et al. | 345/157 |
| 2003/0234765 A1 | | 12/2003 | Suh | |
| 2004/0008184 A1 | * | 1/2004 | Leahy | 345/157 |
| 2005/0057507 A1 | | 3/2005 | Cheng | |
| 2005/0062717 A1 | | 3/2005 | Willat et al. | |
| 2005/0088413 A1 | | 4/2005 | Brewer et al. | |
| 2006/0033714 A1 | | 2/2006 | Boldin | |

OTHER PUBLICATIONS

"Leica TopoMouseTM", http://gi-leica-geosystems.com/documentcenter/topomouse/TopoMouse_brochure.pdf, Copyright 2001-2002.
"Cordless TrackMan Wheel Trackball Mouse For PC & MAC (USB and PS2 connections)", http://www.fentek-ind.com/logitech.htm, Mar. 24, 2006.
Hoffman, Mikael, "Ergonomic Mouce round-up", http://www.techspot.com/reviews/hardware.ergomouse_roundup/, Mar. 24, 2006.
"Hoverstop active ergonomic mouse", http://www.hoverstop.com/eng/benefits.php, Mar. 24, 2006.

* cited by examiner

*Primary Examiner* — My-Chau T Tran

(57) ABSTRACT

An ergonomic mouse is described. A computer mouse may include a position tracking engine and a housing to encapsulate the position tracking engine. The housing may have a bottom portion with a substantially flat surface and an aperture for the position tracking engine. The housing may also have a top portion having a convex portion with a convex curved surface and a first concave portion with a first concave curved surface to receive a human thumb. The first concave portion may have an orientation relative to the bottom portion to cause a substantially neutral wrist deviation when a user grips the top portion.

19 Claims, 11 Drawing Sheets

SECTION A-A

SECTION B-B

100

ERGONOMIC INPUT DEVICE

BACKGROUND

Various types of input devices such as a pointing device allow a user to manipulate a cursor of a computer. A common type of pointing device is a mouse that is typically used for desktop computers or docked laptop computers. A mouse allows for cursor manipulation on a visual display screen of a personal computer or workstation, for example. Cursor manipulation includes actions such as rapid relocation of a cursor from one area of the display screen to another area, pointing to an object, highlighting an object, selecting an object, moving or dragging an object, and so forth.

A mouse typically includes various mechanical parts. In a "roller ball" mouse, for example, a user controls the cursor by moving the mouse over a surface, such as a mouse pad, so that the cursor moves on the display screen in a direction and a distance that is proportional to the movement of the mouse. Similarly, a "track ball" mouse may include a stationary ball with freedom of movement that is rolled by a user with a finger or thumb to control cursor movement on the display screen. Both the roller ball and track ball mice, however, have drawbacks associated with any device that have mechanical parts. Namely, over time the mechanical components wear out, become dirty, or simply break down so that the cursor can no longer be accurately manipulated.

Recently, "optical" mice that use image sensors have been developed. An optical mouse may produce a collimated beam of light that illuminates a surface upon which the mouse rests. A sensor array portion of an image sensor receives the reflected images of the surface as the mouse is traversed across a surface. The changes in successive reflected images are then determined to be mouse movement, which is then interpreted as a desired cursor movement. Such designs are typically superior to mechanical designs.

Despite such improvements in tracking movement of a mouse, there are several ergonomic issues for a mouse that remain to be solved. A mouse may have various design features, to include shape, size, button positions, grip positions, pointing performance, and so forth. A particular combination of design features may affect user comfort, fatigue, pointing accuracy, usability, and so forth. In some cases, a poor design may even lead to health issues such as wrist injuries. Consequently, there is a need for improvements in mouse design to increase comfort, performance and desirability of a mouse, while maintaining the efficiencies gained by improved movement tracking techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to an ergonomic input device such as a mouse that allows a user to manipulate a cursor of a machine or computer. The mouse allows for cursor manipulation on a visual display screen of a personal computer or workstation, for example. Cursor manipulation includes actions such as rapid relocation of a cursor from one area of the display screen to another area or selecting an object on a display screen, as well as other cursor operations.

Some embodiments may be specifically directed to an ergonomic mouse that increases comfort and performance for a user. In one embodiment, for example, a computer mouse may comprise a position tracking engine. The position tracking engine may comprise, for example, an optical position tracking engine. The computer mouse may further comprise a housing to encapsulate the position tracking engine. The housing may include a bottom portion with a substantially flat surface and an aperture for the position tracking engine. The housing may also include a top portion. The top portion may have a convex portion with a convex curved surface. The top portion may also have a first concave portion with a first concave curved surface to receive a human thumb. The first concave portion may have a substantially horizontal orientation relative to the portion to cause a substantially neutral wrist deviation when a user grips the top with a human hand. Other embodiments are described and claimed.

DETAILED DESCRIPTION

Various embodiments may be generally directed to an input device such as a computer mouse. More particularly, some embodiments may be directed to an ergonomic mouse designed to increase comfort, performance, and desirability for a user. The ergonomic mouse may relieve contact pressure from the carpal tunnel at the base of a human wrist by lifting that area of the wrist from a work surface, such as a desk. The ergonomic mouse may place the wrist in a more natural posture by decreasing forearm pronation. For example, typical mice may place a wrist in roughly seventy degrees pronation. Some embodiments may reduce wrist pronation below seventy degrees, and in some cases, as low as fifty-four degrees or lower. The ergonomic mouse may also decrease wrist deviation. Typical mice may place a wrist in approximately eight degrees wrist deviation. Some embodiments may reduce wrist deviation below eight degrees, and in some cases, to a substantially neutral wrist deviation near or at zero degree deviation. The ergonomic mouse may further have a rounded "ball" shape designed to reduce finger extension. This may also reduce carpal tunnel pressure and extensor muscle static load. These and other advantages may be realized while maintaining or improving pointing performance with a relatively rapid learning curve for the user.

Figure 1:
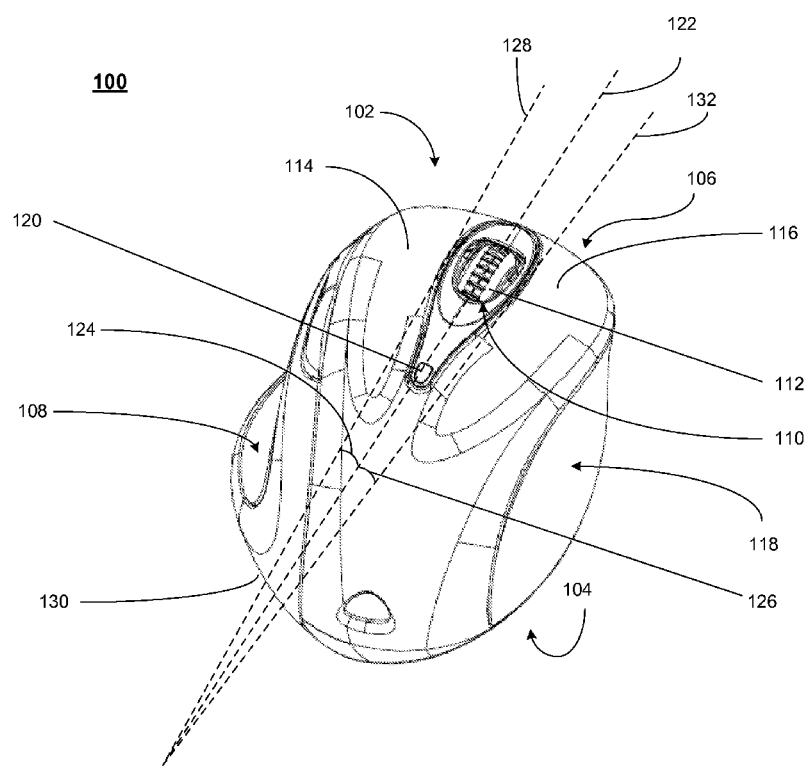
FIG. 1 illustrates a first perspective view of a mouse in accordance with one embodiment.

FIG. 1 illustrates a first perspective view of a mouse in accordance with one embodiment. FIG. 1 illustrates a mouse 100. Mouse 100 may comprise a position tracking engine. The position tracking engine may comprise any combination of hardware and/or software to track movement of mouse 100, such as an optical position tracking engine, a laser position tracking engine, a motion sensor position tracking engine, and so forth. An example of a position tracking engine may comprise position tracking engine 330 as described with reference to FIG. 3. The embodiments, however, are not limited in this context.

In one embodiment, for example, the position tracking engine may comprise an optical position tracking engine. The optical position tracking engine may be arranged to perform imaging and navigation operations. The optical position tracking engine may be implemented with, among other elements, an infrared light emitting diode (LED) and sensor array. The LED may emit light that is projected by a lens through an aperture in a bottom surface of mouse 100 and onto a region that is part of a work surface. The aperture might include a window that has some level of transparency to pass the light from the LED. The work surface may comprise any substantially planar or flat surface, such as paper, cloth, laminated plastic tops, painted surfaces, frosted glass, glass, desk pads, wood, plastic or cloth mouse pads, and so forth. An image of the illuminated region is projected through an optical window in a package portion of an integrated circuit and onto an array of photo detectors. The photo transistors charge capacitors whose voltages are subsequently digitized and stored in a memory. The general level of illumination of the region of interest may be controlled by monitoring the output levels of the photo detectors and adjusting the intensity of light issuing from the LED. This could be accomplished using either continuous control or pulse width modulation, or some combination of both, for example. In one embodiment, for example, the sensor may actually comprise a laser, although the embodiments are not limited in this context.

In various embodiments, mouse 100 may further comprise a housing 130 to encapsulate the position tracking engine. Housing 130 may include a bottom portion 104 with a substantially flat surface and an aperture for the position tracking engine. Housing 130 may also include a top portion 102 having a convex portion 106 with a convex curved surface and a first concave portion 108. First concave portion 108 may have a first concave curved surface arranged to fit and/or receive a human thumb.

In various embodiments, first concave portion 108 may have a substantially horizontal orientation relative to bottom portion 104 to cause or facilitate a substantially neutral wrist deviation when a user grips top portion 102 with a human hand. As used herein, the term "horizontal orientation" may refer to the general position of first concave portion 108 on mouse 100, including a height as measured between bottom portion 104 and first thumb shelf 310, for example. Other ergonomic mouse design factors may also contribute to a substantially neutral wrist deviation as well, including, but not limited to, an overall height for mouse 100, an angle for top portion 102, an angle for wheel button 112, and so forth. Various design factors may also utilize various aspects of a working environment for mouse 100 to further improve wrist deviation. For example, mouse 100 may be designed to cause one side of a user's hand to contact the work surface for mouse 100 when in use. The work surface basically functions as a stop, preventing the hand from deviating. As a result, improved wrist deviation may be achieved when the work surface contacts the side of the hand using mouse 100. These and other ergonomic mouse design factors may be described in more detail below.

In the field of ergonomics, wrist deviation may be determined from a zero degree center or reference line drawn through the middle finger (or possibly the forefinger) and wrist without any side-to-side pivot of the wrist. An example of a reference line may include reference line 122 as shown in FIG. 1. Lateral movement of a hand pivoting at the wrist may create a measured angle from reference line 122, as indicated by angles 124, 126 created by exemplary deviation lines 128, 132, respectively. A first type of wrist deviation is ulnar deviation which is the direction away from the thumb toward deviation line 132, and a second type of wrist deviation is radial deviation which is in the direction towards the thumb toward deviation line 128. An example of a substantially neutral wrist deviation may refer to maintaining a wrist deviation near or at the reference line of zero degrees. Allowing a user to maintain a substantially neutral wrist deviation may reduce user discomfort when operating mouse 100.

FIG. 1 may also show a slot 110 in top portion 102. A wheel button 112 may be exposed through the surface of top portion 102 via slot 110. Buttons 114, 116 may be positioned on each side of wheel button 112. As shown in FIG. 1, wheel button 112 may be positioned along reference line 122. Positioning wheel button 112 along reference line 122 may further promote or facilitate a substantially neutral wrist deviation. In this manner a user may be allowed to operate wheel button 112 using a forefinger while maintaining the substantially neutral amount of wrist deviation. A user may rotate wheel button 112 to scroll up or down a page for on a display, for example, and press buttons 114, 116 to execute operations once a cursor has been properly placed on the display.

FIG. 1 also illustrates a second concave portion 118. Second concave portion 118 may have a second concave curved surface arranged to fit and/or receive one or more finger tips from a human hand. First concave portion 108 and second concave portion 118 may together be used to grip mouse 100 by a user to facilitate movement, lifting, repositioning, or other physical manipulations of mouse 100, as described in more detail later.

As further shown in FIG. 1, top portion 102 may also include a battery indicator light or LED 120. Battery indicator light 120 may provide information to a user regarding power provided by a battery.

Figure 2:
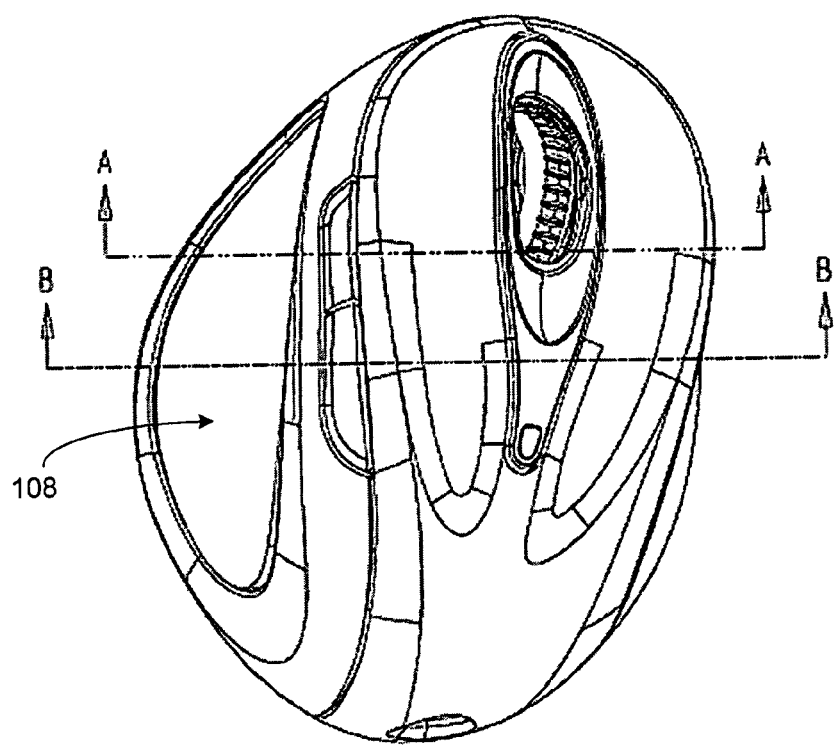
FIG. 2 illustrates a top view of a mouse in accordance with one embodiment.

FIG. 2 illustrates a top view of a mouse in accordance with one embodiment. FIG. 2 illustrates a top view of mouse 100, including cross-section lines A-A and B-B. FIG. 2 provides a greater view of first concave portion 108. As shown in FIG. 2, first concave portion 108 may have an elliptical shape to facilitate receiving a thumb when a user grips mouse 100. It may be appreciated, however, that first concave portion 108 may have other suitable shapes as well, such as an oval, square, rectangular, or circular shape, and so forth. First concave portion 108 may have any desired height and width sufficient to accommodate a diameter for a target user, such as an average human thumb, for example. In some cases, if the anticipated user has a smaller diameter thumb, such as with a child, then the height and width of first concave portion 108 may be adjusted accordingly.

Figure 3:
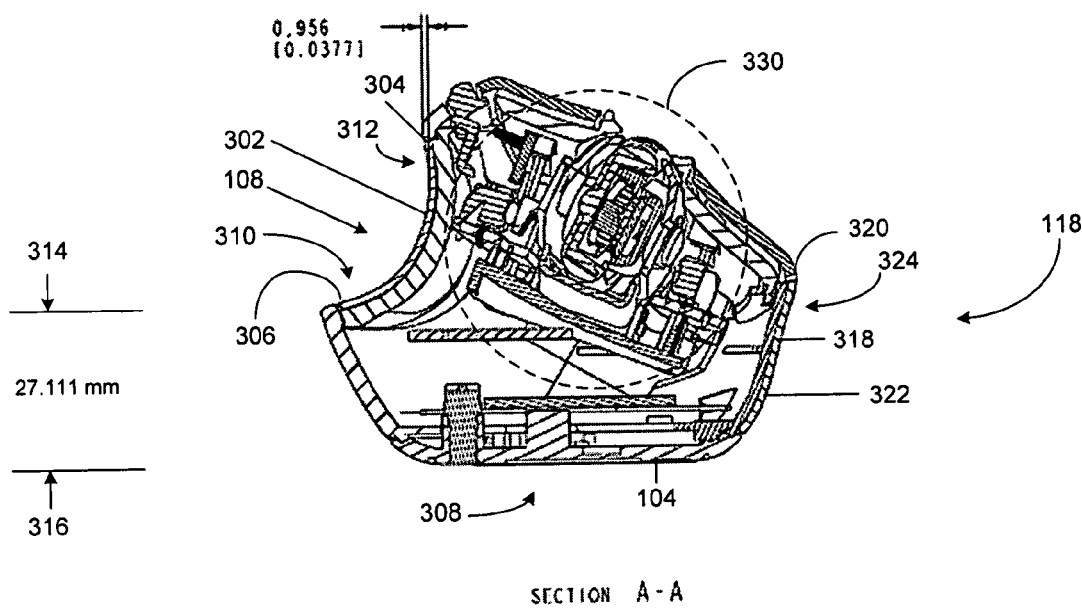
FIG. 3 illustrates a cross-section of the mouse in FIG. 2 taken along the line A-A in accordance with one embodiment of the invention.
Figure 4:
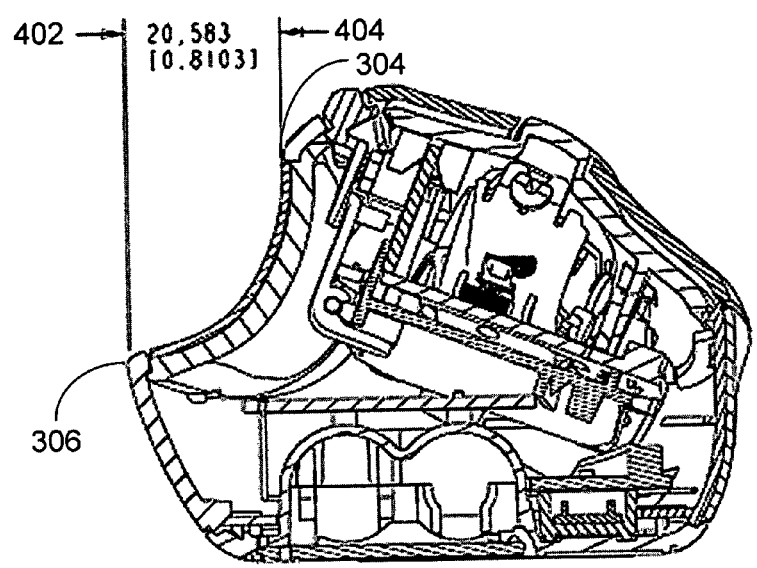
FIG. 4 illustrates a cross-section of the mouse in FIG. 2 taken along the line B-B in accordance with one embodiment of the invention.

FIG. 3 illustrates a cross-section of the mouse in FIG. 2 taken along the line A-A in accordance with one embodiment of the invention. FIG. 3 illustrates a cross-section of mouse 100 taken along line A-A. As shown in FIG. 3, first concave portion 108 may have a first concave curved surface 302 having a top edge 304 and a bottom edge 306. Bottom edge 306 as represented by plane 314 may be positioned a predetermined distance from a substantially flat surface 308 of bottom portion 104 as represented by plane 316. The particular distance between planes 314, 316 may vary in accordance with a number of factors, one of which is the amount of wrist pronation desired for a given implementation. Wrist pronation may refer to a rotation of the forearm that moves the palm from a neutral vertical-facing position to a posterior-facing position. By way of contrast, a vertical to palm up position is typically referred to as supination. Typical mice may be arranged to create approximately seventy degrees of wrist pronation. By way of contrast, some embodiments may reduce wrist pronation below seventy degrees. In some cases, some embodiments may reduce wrist pronation to approximately fifty-four degrees or lower, by varying the distance between planes 314, 316. In one embodiment, for example, the distance between planes 314, 316 may be set at approximately 27 millimeters (mm), although other distances may work as well. In addition, the angle between the bottom and top case as shown in FIG. 3 and FIG. 4 may also have an impact on controlling wrist pronation.

In various embodiments, bottom edge 306 and a portion of first concave curved surface 302 may be arranged to form a first thumb shelf 310 to support a human thumb when a user grips top portion 102 with a human hand. The size and slope of first thumb shelf 310 may vary according to a given implementation. In this manner, a user may grip mouse 100 by placing a thumb in first concave portion 108, and rest the thumb against first thumb shelf 310 while using mouse 100.

In various embodiments, top edge 304 and a portion of first concave curved surface 302 may be arranged to form a second thumb shelf 312 (or overhang) to engage a human thumb when a user grips top portion 102 with a human hand and lifts mouse 100 from a work surface. In this manner, a user may use second thumb shelf 312 to facilitate lifting mouse 100 from the work surface while using reduced pressure to hold each side of mouse 100. The size and slope of second thumb shelf 312 may vary according to a given implementation. A given width for second thumb shelf 312 may vary according to any number of factors. In one embodiment, for example, second thumb shelf 312 may have a width of approximately 0.96 mm, and other widths as well. The embodiments are not limited in this context.

In various embodiments, top portion 102 may include a second concave portion 118 as described with reference to FIG. 1. Second concave portion 118 may have a second concave curved surface 318. Second concave curved surface 318 may include a top edge 320 and a bottom edge 322. Top edge 320 and a portion of second concave curved surface 318 may be arranged to form a finger shelf 324. Finger shelf 324 may be used to engage one or more tips of human fingers from a human hand as a user lifts mouse 100 from a work surface. When used in conjunction, second thumb shelf 312 and finger shelf 324 may allow a user to lift mouse 100 from the work surface using reduced pressure to hold each side of mouse 100.

In various embodiments, mouse 100 may include a position tracking engine 330. Position tracking engine 330 may comprise any combination of hardware and/or software to track movement of mouse 100, such as an optical position tracking engine, a laser position tracking engine, a motion sensor position tracking engine, and so forth, as previously described with reference to FIG. 1. The embodiments are not limited in this context.

FIG. 4 illustrates a cross-section of the mouse in FIG. 2 taken along the line B-B in accordance with one embodiment of the invention. The cross-section taken along line B-B provides a better view of the height and width of first concave portion 108. As previously described with reference to FIG. 2, first concave portion 108 may have an elliptical shape to facilitate receiving a thumb when a user grips mouse 100. First concave portion 108 may have any desired height and width sufficient to accommodate a diameter for a target user, such as an average human thumb, for example. In one embodiment, by way of example, a width between top edge 304 and bottom edge 306 may comprise 20.583 mm, and other widths as well. The embodiments are not limited in this context.

Figure 5A:
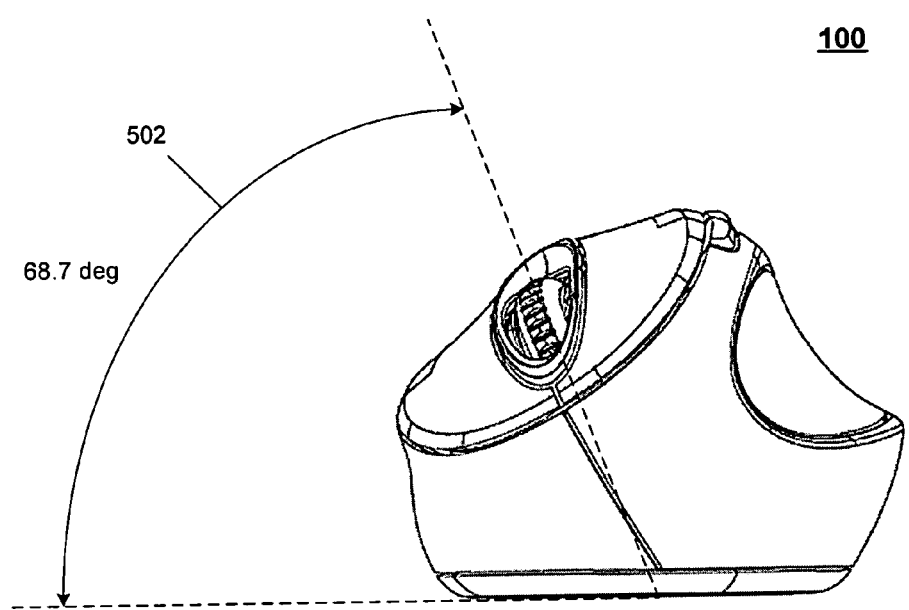
FIG. 5A illustrates a first front view of a mouse in accordance with one embodiment.

FIG. 5A illustrates a first front view of a mouse in accordance with one embodiment. As shown in FIG. 5A, top portion 102 of mouse 100 may have a curved or ball shape. The amount of curve or ball shape of top portion 102 may be selected to match the average human hand in a relaxed or natural state, as represented by curve 502. In one embodiment, for example, curve 502 may comprise an angle of approximately 69 degrees between wheel button 112 and plane 316. Other angles and diameters may also be used as desired for a given implementation. The embodiments are not limited in this context.

Figure 5B:
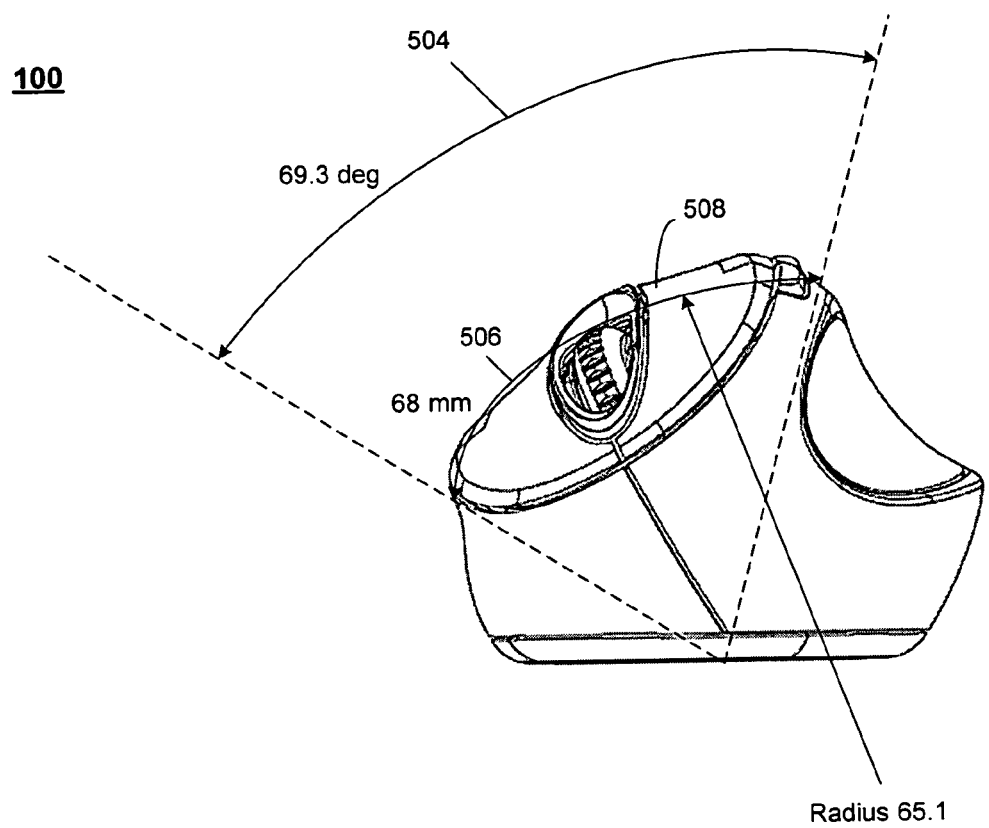
FIG. 5B illustrates a second front view of a mouse in accordance with one embodiment.

FIG. 5B illustrates a second front view of a mouse in accordance with one embodiment. As shown in FIG. 5B, mouse 100 may include top portion 102 having convex portion 106 with a convex curved surface 508. Convex curved surface 508 may have a generally curved or ball shape as represented by curve 504. In one embodiment, for example, convex curved surface 508 may have an angle of approximately 69 degrees from top edge 320 of second concave portion 118 to top edge 304 of first concave portion 108. Other angles may also be used as desired for a given implementation. In one embodiment, for example, top portion 102 may have an arc 506 with an arc length of approximately 68 mm and a radius of 65 mm. Other arc length values and radius values may also be used as desired for a given implementation. The embodiments are not limited in this context.

As shown in FIGS. 5A and 5B, top portion 102 of mouse 100 may have a curved shape to match a human hand while in a relaxed or natural state. When in a relaxed state, the fingers of a human hand tend to maintain a bent position, sometimes referred to as flexion state. Flexion may refer to a bending movement that decreases the angle between two parts. Examples of flexion include bending an elbow or clenching a hand into a fist. Curves 502, 504 of top portion 102 may be selected to match the amount of relaxed finger flexion for a target user, or a population. In this manner, top portion 102 may be arranged to reduce the amount of finger extension for users, thereby increasing comfort and decreasing user fatigue when using mouse 100.

Figure 6:
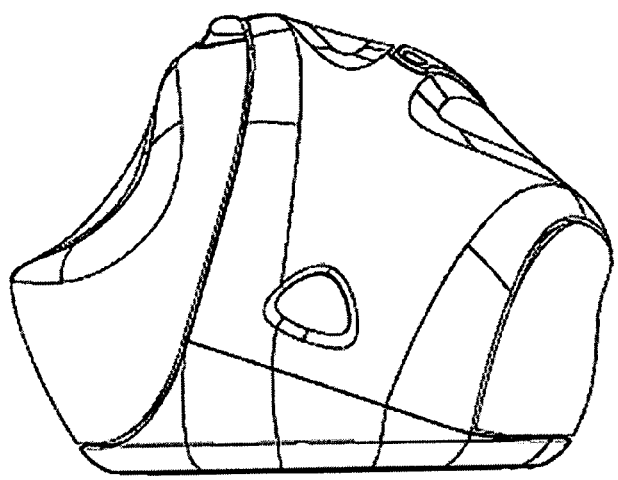
FIG. 6 illustrates a back view of a mouse in accordance with one embodiment.
Figure 6:
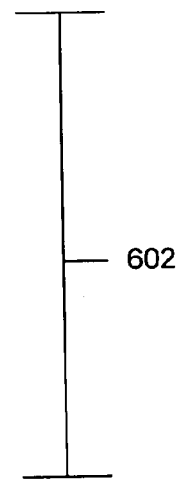
Figure 6:
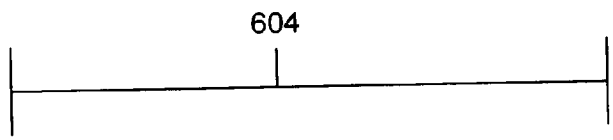

FIG. 6 illustrates a back view of a mouse in accordance with one embodiment. FIG. 6 further illustrates curve 502 of top portion 102. As shown in FIG. 6, mouse 100 may have a given size as partially measured by height 602 and a width 604 to approximate the size of a hand for a target user. The particular values for height 602 and width 604 may vary based on the average sized hand for a target user, or a population. These values, in combination with first concave portion 108 and a selected height and slope of wheel button 112, may drive forearm posture for a user, and thereby remove contact pressure from the base of the wrist when using mouse 100. The given size selected for mouse 100 makes it easier to handle, and maintains or potentially improves pointing performance relative to other ergonomic mouse designs.

Figure 7:
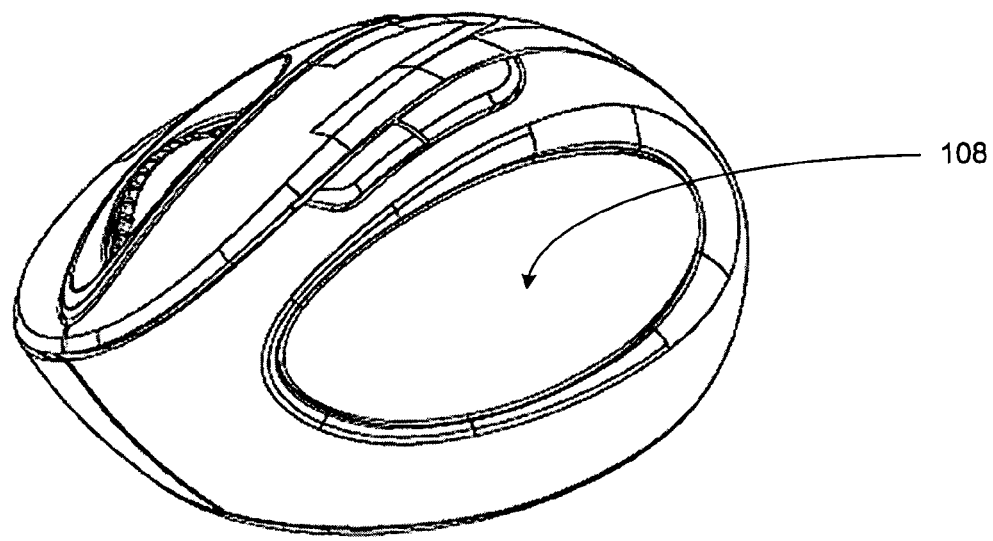
FIG. 7 illustrates a second perspective view of a mouse in accordance with one embodiment.

FIG. 7 illustrates a second perspective view of a mouse in accordance with one embodiment. FIG. 7 illustrates a second perspective view of mouse 100. FIG. 7 provides a top left view of first concave portion 108 as viewed from the left side of mouse 100. FIG. 7 illustrates a size and shape for first concave portion 108 relative to mouse 100 that may be suitable for an average human hand for an adult user. Other sizes and shapes, however, may be used as well as desired for a given implementation. The embodiments are not limited in this context.

Figure 8:
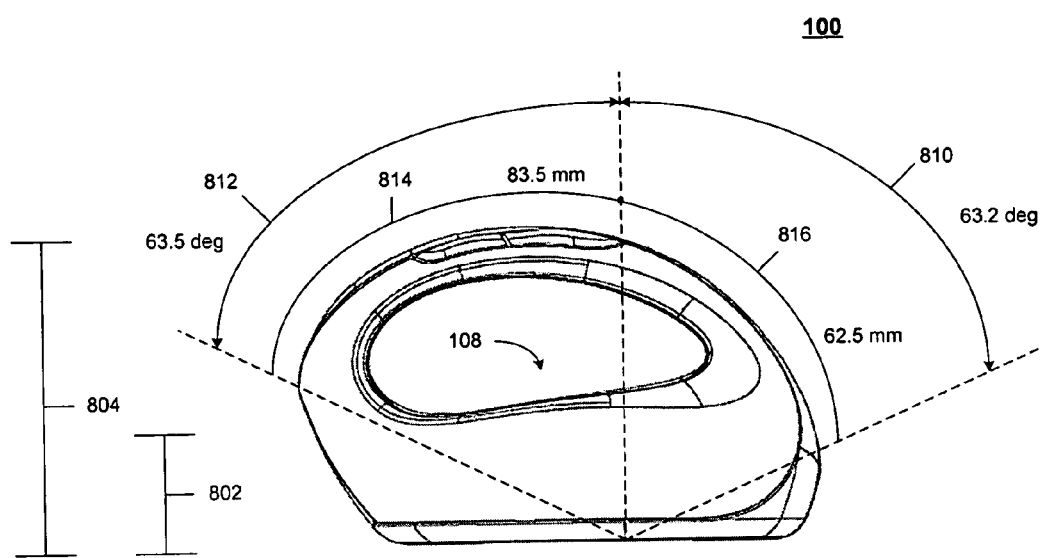
FIG. 8 illustrates left side view of a mouse in accordance with one embodiment.

FIG. 8 illustrates left side view of a mouse in accordance with one embodiment. FIG. 8 illustrates a left side view of mouse 100. FIG. 8 provides an exemplary embodiment of mouse 100 with an approximate height 802 of first concave portion 108 relative to an overall height 804 of mouse 100. As shown in FIG. 8, top portion 102 may have curve angles 810, 812. In one embodiment, for example, curve angles 810, 812 may comprise approximately 63 degrees and approximately 64 degrees, respectively. In one embodiment, for example, top portion 102 may also have arcs 814, 816. Arcs 814, 816 may have arc lengths of approximately 84 mm and approximately 63 mm, respectively. Other curve angles and arc lengths may also be used, and the embodiments are not limited in this context.

Figure 9:
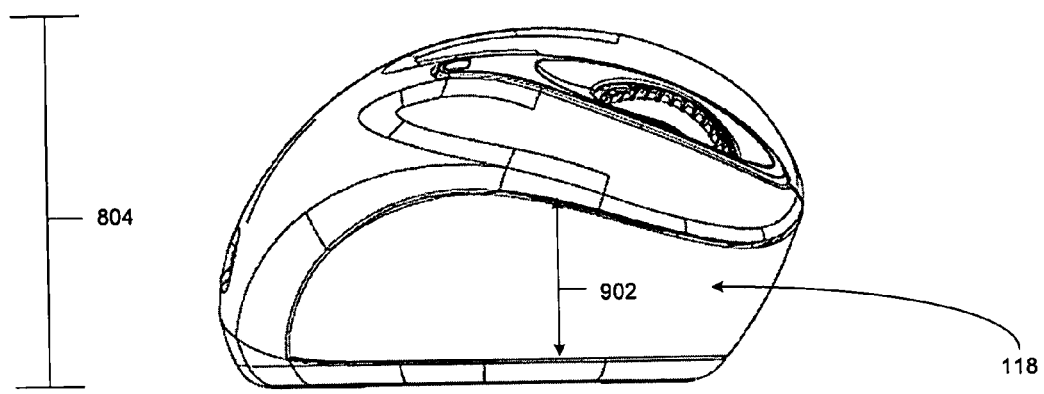
FIG. 9 illustrates a right side view of a mouse in accordance with one embodiment.

FIG. 9 illustrates a right side view of a mouse in accordance with one embodiment. FIG. 9 illustrates a right side view of mouse 100. FIG. 9 provides an illustration for an exemplary embodiment of mouse 100 with an approximate height 902 of second concave portion 118 relative to an overall height 804 of mouse 100.

Figure 10:
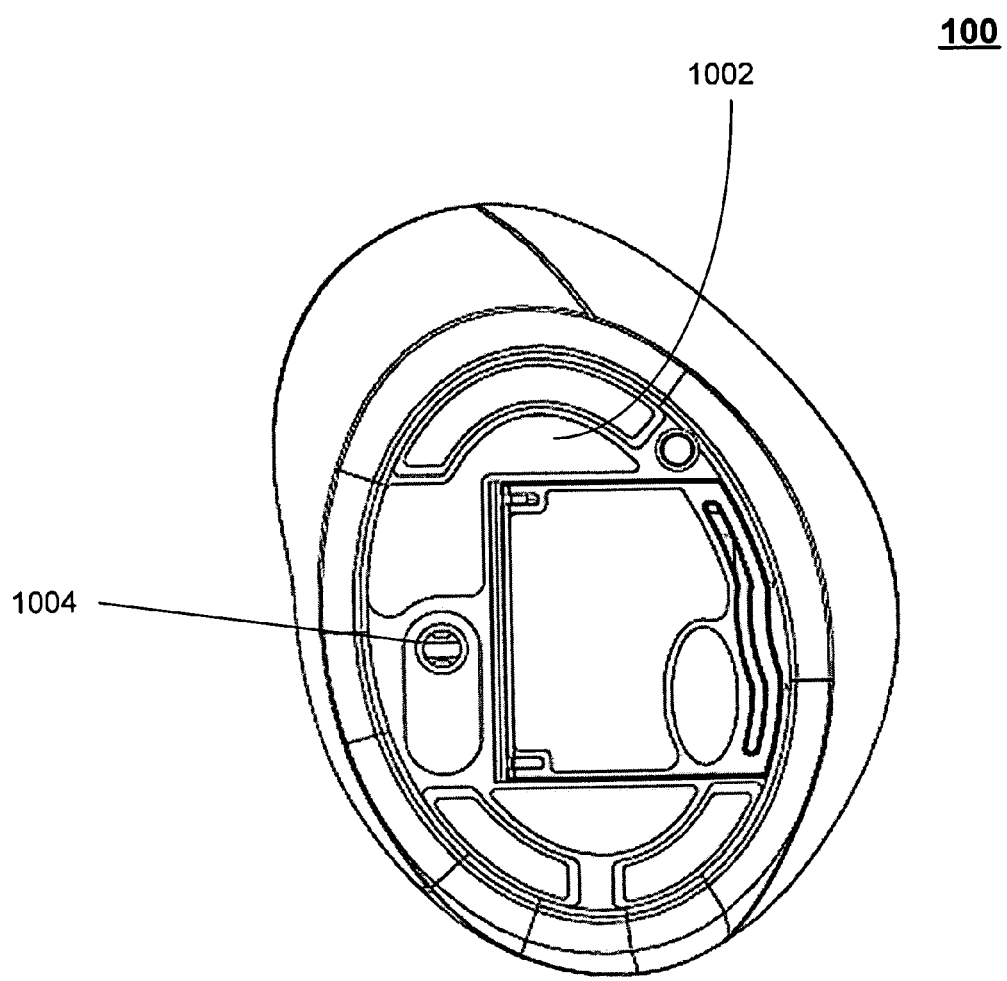
FIG. 10 illustrates a bottom view of a mouse in accordance with one embodiment.

FIG. 10 illustrates a bottom view of a mouse in accordance with one embodiment. FIG. 10 illustrates a bottom view of mouse 100. FIG. 10 provides an illustration for an exemplary embodiment of mouse 100 with a substantially flat surface 1002 and an aperture 1004 (and LED) of an optical position tracking engine as described with reference to FIG. 1.

The various embodiments may achieve or drive certain ergonomic characteristics through the overall shape and size of mouse 100. For example, mouse 100 may tilt a hand up onto its side and off of the vulnerable wrist area through its tilted posture. This posture is less horizontal and more curved then other mouse designs. The curved posture provides several advantages. For example, the curved posture provides for a more relaxed or natural posture for finger positions. Conventional mouse designs tend to force a user's fingers into an extended and unnatural position. In another example, the curved posture and less aggressive tilt allow faster pointing speed and productivity relative to other ergonomic mice. By way of contrast, conventional ergonomic mouse designs have a more vertical posture which may slow productivity. In yet another example, the curved posture and less aggressive tilt is more familiar to users, thereby decreasing a learning curve for users. In still another example, the curved posture and thumb scoop facilitates lifting and repositioning mouse 100 during mouse operations. Conventional mouse designs tend to require greater amounts of pinching pressure to grip and move the mouse. In yet another example, the curved posture and thumb scoop promotes decreased pronation and wrist deviation as previously described.

Various embodiments may describe various design features of mouse 100 suitable for use by a right-handed user. It may be appreciated, however, that the same or similar principles described for a right-handed user may also be implemented for a left-handed user as well. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer mouse, comprising:
   a position tracking engine; and
   a housing to encapsulate said position tracking engine, said housing having a bottom portion with a substantially flat surface and an aperture for said position tracking engine, said aperture including a window, and a top portion having a convex portion with a convex curved surface and a first concave portion with a first concave curved surface to receive a human thumb, said first concave portion having a substantially horizontal orientation relative to said bottom portion to cause a substantially neutral wrist deviation when a user grips said top portion, said first concave curved surface having a top edge and a bottom edge, said bottom edge and a portion of said first concave curved surface forming a first thumb shelf to support said human thumb when said user grips said top portion with a human hand.

2. The computer mouse of claim 1, said first concave portion having an elliptical shape.

3. The computer mouse of claim 1, said first concave portion having a width to accommodate a diameter for an average human thumb.

4. The computer mouse of claim 1, said first concave portion having a height to accommodate a diameter for an average human thumb.

5. The computer mouse of claim 1, said first concave curved surface having a top edge and a bottom edge, said bottom edge positioned a predetermined distance from said substantially flat surface to decrease pronation of a human hand to less than seventy degrees pronation when said user grips said top portion with said human hand.

6. The computer mouse of claim 1, said first concave curved surface having a top edge and a bottom edge, said top edge and a portion of said first concave curved surface forming a second thumb shelf to engage said human thumb when said user lifts said computer mouse from said work surface.

7. The computer mouse of claim 1, said top portion including a second concave portion with a second concave curved surface having a top edge and a bottom edge, said top edge and a portion of said second concave curved surface forming a finger shelf to engage at least one tip of a human finger from said human hand when said user lifts said computer mouse from said work surface.

8. The computer mouse of claim 1, said convex portion having a slot for a wheel button, said wheel button positioned at an angle to promote said substantially neutral wrist deviation.

9. An input device, comprising:
   a position tracking engine; and
   a housing to surround said position tracking engine, said housing having a top portion and a bottom portion, said bottom portion having an aperture for said position tracking engine, said aperture including a window, said top portion having a convex portion with a convex curved surface to fit an average human hand in a relaxed state, and a thumb scoop formed to receive a human thumb, said thumb scoop positioned to cause a substantially neutral wrist deviation when a user grips said housing with said human hand, said thumb scoop having a concave curved surface with a top edge and a bottom edge, said bottom edge and a first portion of said concave curved surface to form a first thumb shelf to support said human thumb when said user grips said housing with said human hand.

10. The input device of claim 9, said convex portion having a slot for a wheel button, said wheel button positioned at an angle to promote said substantially neutral wrist deviation, and input buttons disposed on each side of said wheel button.

11. The input device of claim 9, said bottom portion having a substantially flat surface to engage a work surface, said thumb scoop to have a substantially horizontal orientation relative to said substantially flat surface.

12. The input device of claim 9, said position tracking engine comprising an optical position tracking engine.

13. The input device of claim 9, said bottom edge positioned a predetermined distance from said substantially flat surface to promote said substantially neutral wrist deviation.

14. The input device of claim 9, said top edge and a second portion of said concave curved surface to form a second thumb shelf to engage said human thumb when said user lifts said input device.

15. A human interface device, comprising:
a position tracking engine; and
a housing to house said position tracking engine, said housing having a top portion and a bottom portion, said bottom portion having a substantially flat surface and an aperture for said position tracking engine, said aperture including a window, said top portion having a convex portion with a convex curved surface to fit a human hand, and a concave portion with a concave curved surface to receive a human thumb, said concave portion having a substantially horizontal orientation relative to said bottom portion to reduce wrist deviation to less than eight degrees deviation when a user grips said top portion with said human hand, said concave portion having a concave curved surface with a bottom edge, said bottom edge and a portion of said concave curved surface to form a resting thumb shelf to support said human thumb when said user grips said top portion with said human hand.

16. The human interface device of claim 15, said concave portion positioned a predetermined distance from said bottom portion to decrease pronation of said human hand to less than seventy degrees pronation when said user grips said top portion with said human hand.

17. The human interface device of claim 15, said concave portion positioned a predetermined distance from said bottom portion to decrease wrist extension to less than fifteen degrees extension when said user grips said top portion with said human hand.

18. The human interface device of claim 15, said convex curved surface having a shape to reduce carpal tunnel contact pressure and static finger extension for said human hand.

19. A computer mouse, comprising:
a position tracking engine; and
a housing to encapsulate said position tracking engine, said housing having a bottom portion with a substantially flat surface and an aperture for said position tracking engine, and a top portion having a convex portion with a convex curved surface and a first concave portion with a first concave curved surface to receive a human thumb, said first concave portion having a substantially horizontal orientation relative to said bottom portion to cause a substantially neutral wrist deviation when a user grips said top portion, said top portion including a second concave portion with a second concave curved surface having a top edge and a bottom edge, said top edge and a portion of said second concave curved surface forming a finger shelf to engage at least one tip of a human finger from said human hand when said user lifts said computer mouse from said work surface.

* * * * *

UNITED STATES PATENT AND TRADEMARK OFFICE
CERTIFICATE OF CORRECTION

| | | |
|---|---|---|
| PATENT NO. | : 8,022,930 B2 | Page 1 of 1 |
| APPLICATION NO. | : 11/444876 | |
| DATED | : September 20, 2011 | |
| INVENTOR(S) | : Daniel L. Odell et al. | |

It is certified that error appears in the above-identified patent and that said Letters Patent is hereby corrected as shown below:

IN THE SPECIFICATIONS:

In column 2, line 15, before "portion" insert -- bottom --.

In column 2, line 16, before "with a" insert -- portion --.

Signed and Sealed this
Twenty-ninth Day of November, 2011

David J. Kappos
*Director of the United States Patent and Trademark Office*